July 14, 1942.  L. AMARA  2,289,473
SHOEMAKER'S JACK
Filed Dec. 17, 1941   3 Sheets-Sheet 1
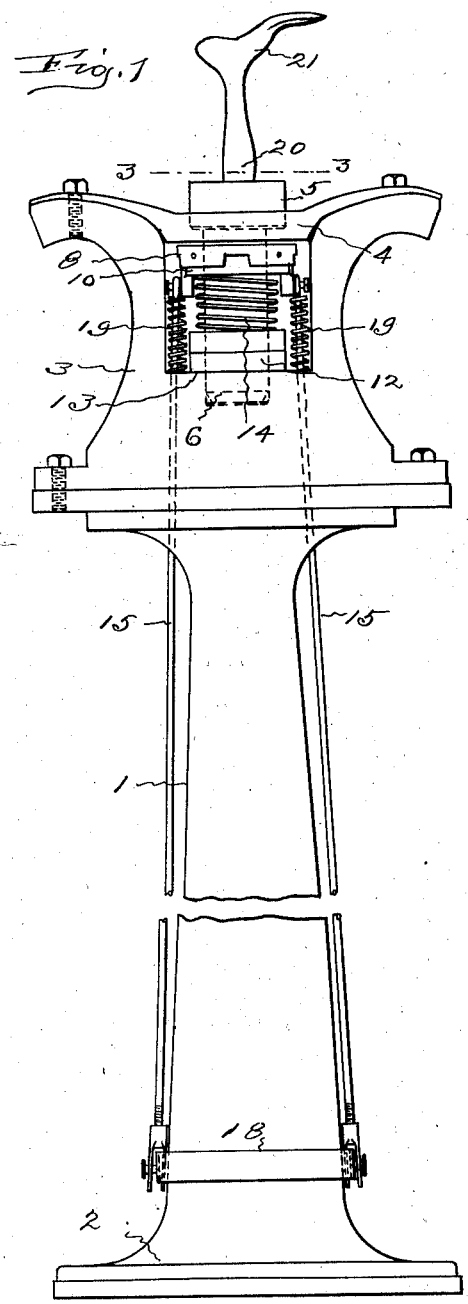
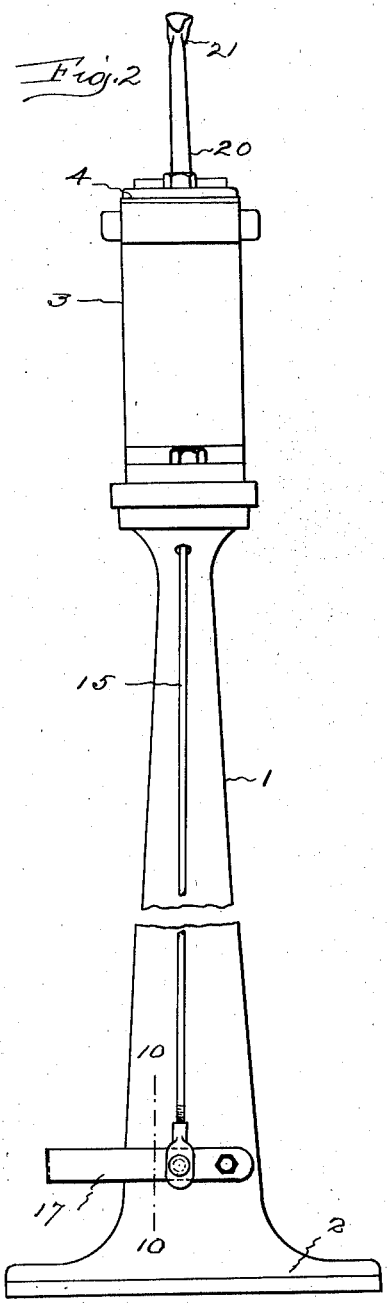
INVENTOR.
Louis Amara
BY
Harry P. Williams
ATTORNEY.

July 14, 1942.    L. AMARA    2,289,473
SHOEMAKER'S JACK
Filed Dec. 17, 1941    3 Sheets-Sheet 2
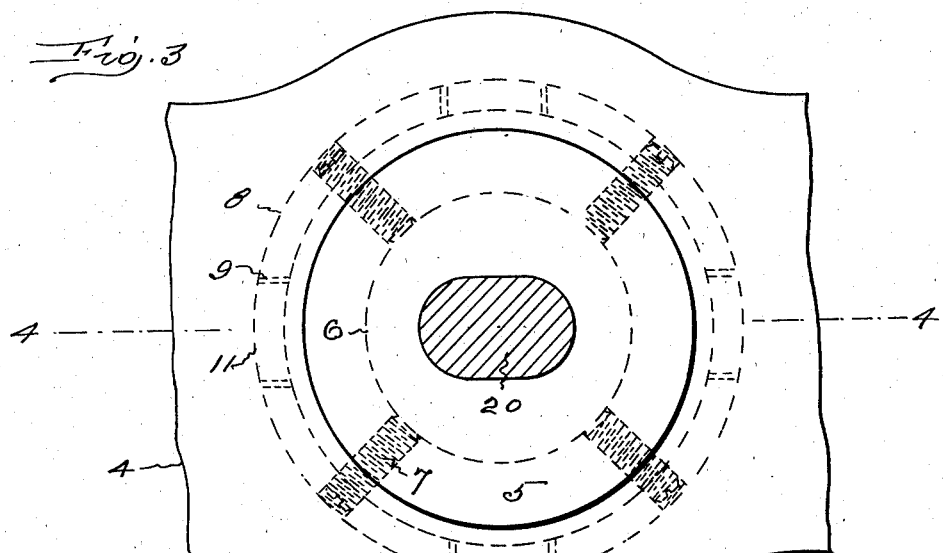
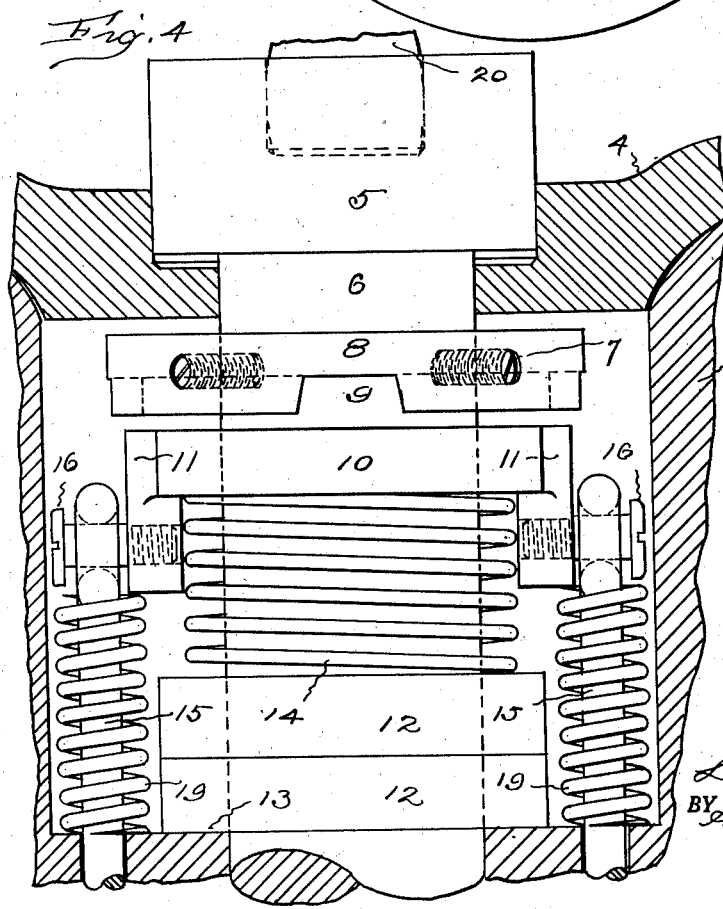
INVENTOR.
Louis Amara
BY Harry P. Williams
ATTORNEY.

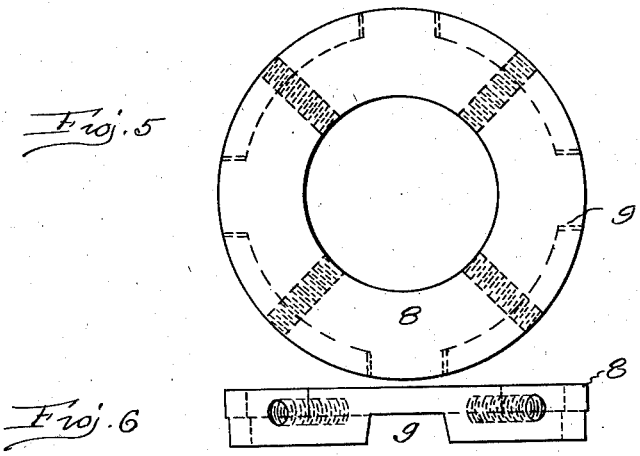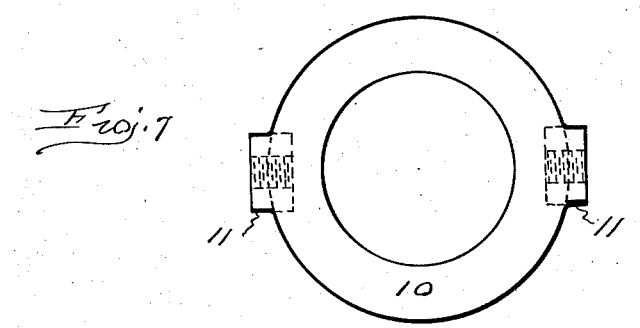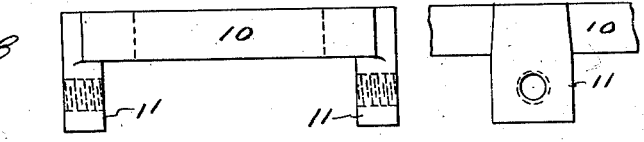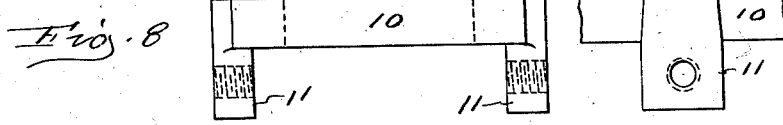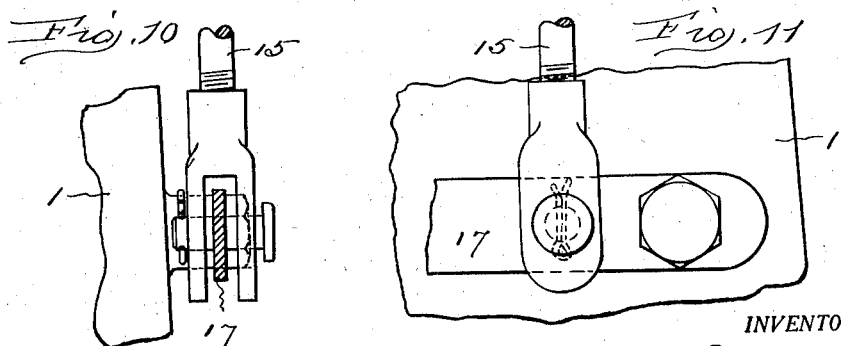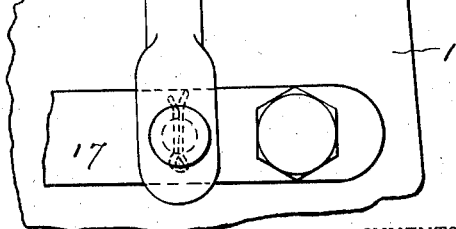

Patented July 14, 1942

2,289,473

UNITED STATES PATENT OFFICE 2,289,473

SHOEMAKER'S JACK

Louis Amara, Hartford, Conn.

Application December 17, 1941, Serial No. 423,349

3 Claims. (Cl. 12—123)

This invention relates to the apparatus which is used in shoe factories and in cobblers' shops, for holding the last on which a shoe is supported while being welted, soled and heeled.

The object of the invention is to provide a very simple, relatively inexpensive and easily manipulated apparatus or jack which will support a last in such manner that without removal the last can be quickly turned to and locked in the most convenient position for welting, heeling and soling a shoe on the last.

This object is attained by rotatably mounting in a suitable frame a head that has an opening for receiving the shank of the last, and providing a clutch for locking the head with the last in the several desired positions, which clutch is released by the pressure of the foot of the operative on a treadle that is connected with one of the clutch members.

Fig. 1 of the accompanying drawings shows a front elevation of the apparatus.

Fig. 2 shows a side elevation.

Fig. 3 on larger scale, is a horizontal section on the plane indicated by the dotted line 3—3 on Fig. 1, showing the rotatable jack head in plan.

Fig. 4 is a vertical section on the plane indicated by the dotted line 4—4 on Fig. 3 showing in elevation the jack head, the clutch members and the cushion support for the head.

Fig. 5 is a plan view of the female member of the clutch.

Fig. 6 is an edge view of the female clutch member.

Fig. 7 is a plan view of the male member of the clutch.

Fig. 8 is an edge view of the male clutch member looking from the front.

Fig. 9 is a detail of the male clutch member looking from the side.

Fig. 10 is a section on the plane indicated by the dotted line 10—10 on Fig. 2.

Fig. 11 is a side view of the parts shown in Fig. 10.

The machine illustrated as embodying the invention has a pedestal 1 which rises from a base 2. Mounted on the pedestal is a frame that is shown as comprising a box 3 and a cover 4. A jack head 5 is journalled in the frame so that it may be rotated. Secured to the journal 6 of the jack head by screws 7, is a collar 8 the under side of which is recessed and slotted to form the female member 9 of a positive clutch. Movable longitudinally on the journal 6 is a collar 10 that on each side has lugs 11 adapted to function as the male member of the clutch. Between the collar 10 and washers 12 that rest upon a shoulder 13 in the frame is a heavy spring 14 which spring not only tends to cause a firm engagement of the male and female clutch members, but also acts as a cushion for the jack head when the last is being used. The upper ends of rods 15 are by studs 16 connected with the lugs 11 that extend from the collar 10. The lower ends of the rods 15 on the outside of the pedestal are connected with the pivoted arms 17 of the treadle 18. Springs 19 are arranged on the rods 15 between the lugs 11 and the shoulder 13 in the frame.

The shank 20 of the last 21 is thrust into a hole in the jack head and the last turned to the required position. The springs press the collar 10 upward so that the lugs 11 of the male clutch member enter the slots of the female clutch member 9 and lock the head and last against rotation. Pressure of the foot of the operative on the treadle, through the rods on each side, draws down the collar 10 and disengages the clutch members leaving the female member of the clutch free so that the head with the last may be rotated to any desired position. When the pressure is released from the treadle the clutch members again engage and lock the head with the last in the position to which it was turned. The clutch illustrated is so formed that the last when released is free to be quickly turned by the operative to the right or left, so as to position the heel section toward the front or back or either side or position the toe section toward the front or the back or either side, according to the work the shoe maker is to undertake. The apparatus described eliminates the necessity of removing the last from the support each time a different operation is performed on a shoe, resulting in a valuable saving of time for the operative.

The invention claimed is:

1. A shoe maker's jack which comprises a support, a head having a journal rotatably mounted in the support, said head having a socket for receiving the shank of a last, a clutch member secured to the journal of the head and rotatable therewith, a clutch member movable axially but held from rotation on said journal, a treadle, rods connecting the treadle with the axially movable clutch member, and spring means normally causing the axially movable clutch member to engage with and lock the rotatable clutch member from movement, said spring means providing a cushion for the clutch members and head and adapted to be contracted by the depression of the treadle for disengaging the clutch members and allowing the head to be rotated.

2. A shoe maker's jack which comprises a support, a head having a socket for receiving the shank of a last, rotatably mounted on the support, a collar with a clutch member secured to and rotatable with the head, a non-rotatable collar with a clutch member movable axially into and out of engagement with the rotatable clutch member, a spring positioned between said axially movable collar and a fixed part of the support, said spring normally causing the engagement of said clutch members and providing a cushioning bed for said collars and head, a treadle, rods connecting the treadle with the axially movable clutch member, and springs on said rods arranged to thrust between said axially movable collar and a fixed part of the support and retain the treadle raised, said treadle and cushioning springs being adapted to be contracted by the depression of the treadle for disengaging the clutch members and allowing the head to be rotated.

3. A shoe maker's jack which comprises a support, a head with a socket for receiving the shank of a last, rotatably mounted on the support, a collar with slots secured to and rotatable with the head, a non-rotatable collar with lugs adapted to be moved axially into and out of engagement with said slotted collar, a spring positioned between said axially movable collar and a fixed part of said support and providing a cushioning bed for said collars and head, said spring normally causing a locking engagement of the lugs on the axially movable collar with said slots of the rotatable collar, a treadle, means connecting said treadle with said lugs, and spring means arranged to retain said treadle lifted, said treadle when depressed adapted to contract said spring means and withdraw said lugs from said slots and allow the rotatable collar and head to be freely turned.

LOUIS AMARA.